United States Patent [19]
Yamanaka et al.

[11] 4,417,341
[45] Nov. 22, 1983

[54] GLASS LASER AMPLIFIER HAVING A NUMBER OF TRIGGER MEMBERS

[75] Inventors: Chiyoe Yamanaka, Ashiya; Yoshiaki Kato, Hirakata; Kunio Yoshida, Takatsuki; Eiji Yoshida, Osaka, all of Japan

[73] Assignee: The President of Osaka University, Japan

[21] Appl. No.: 190,485

[22] Filed: Sep. 24, 1980

[30] Foreign Application Priority Data

Feb. 25, 1980 [JP] Japan ............................... 55-022366

[51] Int. Cl.³ ........................................... H01S 3/093
[52] U.S. Cl. ...................................... 372/72; 372/70; 372/61; 372/107
[58] Field of Search .................. 372/70, 72, 69, 87, 372/86, 55, 61, 81, 107, 103, 108; 313/113

[56] References Cited
U.S. PATENT DOCUMENTS 3,136,959 6/1964 Culver ................................. 372/70
3,521,178 7/1970 Herbrich ............................. 372/70
3,521,189 7/1970 Koenig ............................... 372/70
4,232,276 11/1980 Iwata .................................. 372/72

Primary Examiner—James W. Davie
Assistant Examiner—Léon Scott, Jr.
Attorney, Agent, or Firm—Robert E. Burns; Emmanuel J. Lobato; Bruce L. Adams

[57] ABSTRACT

A glass laser amplifier having a number of trigger members comprising a number of flash lamps capable of emitting light to pump a laser glass arranged around said laser glass, a number of reflection mirrors for reflecting light from each of said flash lamps against said laser glass, and a number of trigger members each arranged at a side of a flash lamp opposite the reflection mirror with the flash lamp being held therebetween. Deflection of electric current in the flash lamp by the reflection mirrors is eliminated, and local heating of the inner wall of the flash lamp is prevented by the efficient elimination of the current deflection, resulting in an extensive life of the entire assembly.

9 Claims, 7 Drawing Figures

FIG.1
PRIOR ART
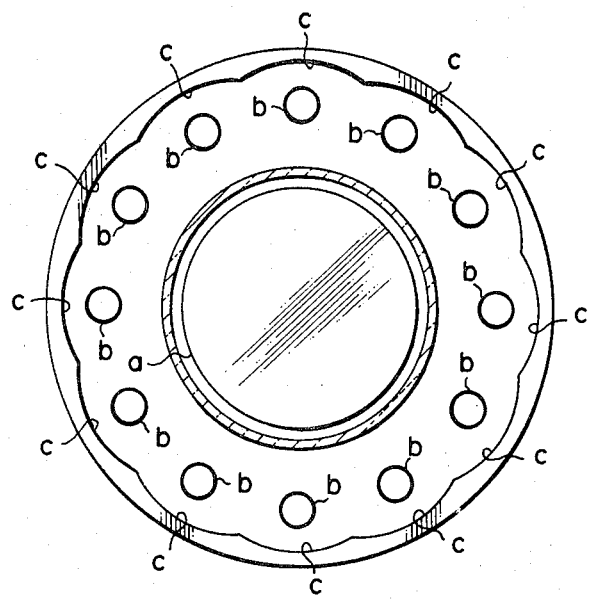
FIG.2-a
PRIOR ART
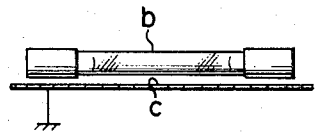
FIG.2-b
PRIOR ART
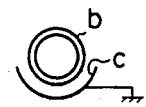
FIG.3
PRIOR ART
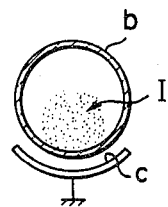

FIG. 4
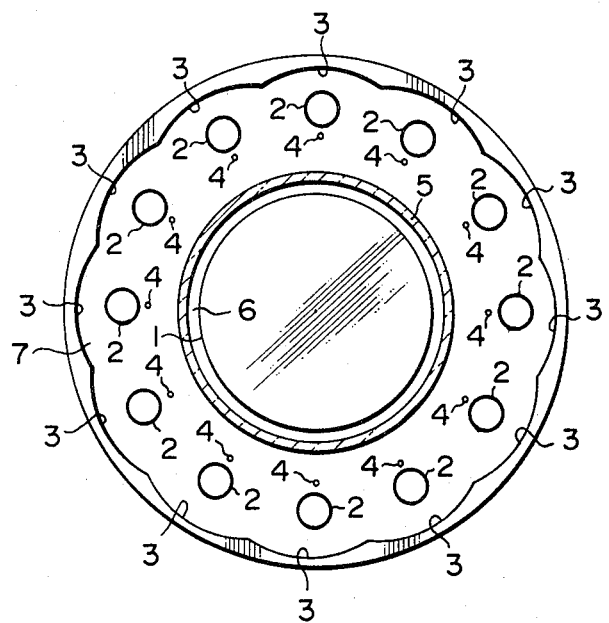
FIG. 5-a
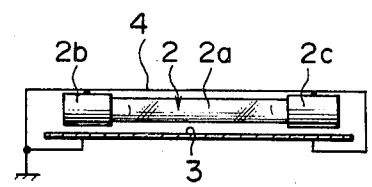
FIG. 5-b
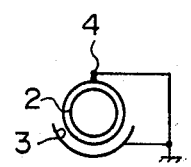

GLASS LASER AMPLIFIER HAVING A NUMBER OF TRIGGER MEMBERS

DETAILED DESCRIPTION OF THE INVENTION

This invention relates to a glass laser amplifier which is suitable for producing nuclear fusion energy etc.

In recent years, generation of nuclear fusion energy produced by a laser system has been a popular technique for producing a new energy.

BACKGROUND OF THE INVENTION

When a nuclear fusion energy is to be produced, there has been applied such a glass laser amplifier as illustrated in FIG. 1.

This conventional type of the glass laser amplifier is provided with a number of flash lamps b for pumping a laser glass a by their light emitting function and a number of reflection mirrors c for reflecting light from these flash lamps b toward the laser glass a, and further as shown in FIGS. 2a and 2b, the reflection mirror c are connected to the ground.

However, as shown in FIG. 3, this type of conventional glass laser amplifier has such disadvantages as the electric current I in the flash lamp b is deflected toward the reflection mirrors c under an influence of the electric field produced by the reflection mirrors c having an earth potential, so that the inner wall of the quartz tube of the flash lamp b is partially heated by the electric current I of the flash lamp, resulting in making a high tensional strain in the inner wall of the quartz tube. The flash lamps b will explode when the strain exceeds a certain value.

The present invention has its object to solve such problems as described above by providing a glass laser amplifier with trigger means in which the deflected electric current of the flash lamps caused by the reflection mirrors is eliminated by the trigger members and durability of the flash lamps is highly improved.

SUMMARY OF THE INVENTION

In reference to the foregoing a glass laser amplifier having a trigger means of the present invention in which a plurality of flash lamps are arranged around a laser glass and a number of reflection mirrors to cause a light from each of said flash lamps to be reflected against said laser glass is characterized in that a number of trigger members are arranged at a side of a flash lamp opposite said reflection mirrors with each of said flash lamps being held therebetween in order to eliminate a deflection of the electric current in each of said flash lamps.

BRIEF DESCRIPTION OF THE DRAWINGS

Referring now to the drawings, preferred embodiments of the present invention, i.e. a glass laser amplifier having a trigger member will be described.

FIGS. 1, 2a, 2b, and 3 all represent a laser incorporating features of the prior art device.

FIG. 4 is a schematic section of the glass laser amplifier for illustrating its structure.

FIG. 5a is a front elevational view and FIG. 5b is a sectional view of a flash lamp, a reflection mirror and a trigger member.

DESCRIPTION OF THE PREFERRED EMBODIMENTS

Figure 6:
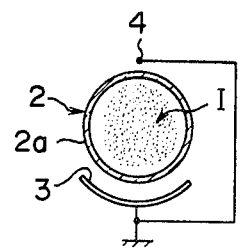
FIG. 6 is a schematic illustration for showing a the operation of the combination of the flash lamp, reflection mirror and trigger member.

As illustrated in FIG. 4, a number of flash lamps 2 are arranged around a disk laser glass 1 which is applied as a laser glass. As used herein, the term "laser glass" means a glass element of a laser in which laser action or lasing occurs. Reflection mirrors 3 having a concave section are arranged at a position outwardly spaced apart from each of the flash lamps 2 in order to reflect light from the flash lamps 2 toward the disk laser glass 1.

The disk laser glass 1 receives directly or indirectly via reflection mirrors 3 light from the flash lamps 2 and obtains an excited condition upon absorbing of the light. When a laser beam passes through the disk laser glass 1, an induced emission of the laser beam will be generated and thereby the laser beam will be amplified.

The flash lamp 2 may produce high intensity light by having applied thereto a high electric current of several KA to 10 KA.

The reflection mirrors 3 are connected continuously with both their ends adjacent to other adjoining reflection mirrors. The number of the reflection mirrors 3 is the same as that of the flash lamps 2 and they are arranged as a whole in an annular form.

Each of the reflection mirrors 3 is made of brass and its polished reflection surface is coated with a gold plating or a silver plating. Reflection of more than 90% of the flash lamp light by the reflection surface may enable an efficient and superior excitation of the disk laser glass 1.

It is also possible to use an electrolyte polished aluminum as the reflection mirror 3 rather than brass.

The reflection mirror 3 is connected to the ground or earth as illustrated in FIGS. 5a and 5b, respectively, and thereby the reflection mirror 3 is at ground or earth potential.

Further, as illustrated in FIGS. 4, 5a and 5b, a number of trigger wires 4 used as the trigger members are applied in tension in such a direction as extending lengthwise of the reflection mirror 3 at a place opposite to the reflection mirror 3 with the flash lamp 2 being held therebetween.

The trigger wire 4 is closely arranged at a quartz glass tube 2a of the flash lamp 2, thus a distance between the trigger wire 4 and the quartz glass tube 2a is extremely as compared with that between the reflection mirror 3 and the quartz glass tube 2a.

Each of the trigger lines 4 is connected to the ground or earth in common with the reflection mirror 3 and thereby each of the trigger wires 4 is at the same ground or earth potential as that of the reflection mirror 3.

The trigger wire 4 has both its ends supported at both electric pole coverings 2b and 2c of the flash lamp 2. (See FIG. 5a.)

Arrangement of the trigger wire 4 at an opposite side of the reflection mirror 3 with the flash lamp 2 being held therebetween enables a formation of an electric field to diminish a deflection of electric current I of the flash lamp 2 which is deflected by the reflection mirror 3. Thus, as illustrated in FIG. 6, the flash lamp current I will flow uniformly within the quartz glass tube 2a, resulting in no local heating of the inner wall of the quartz glass tube 2a occurring and then it is possible to have a substantial decrease of strain and tension.

In view of this fact, it is possible to extend the life of the flash lamp 2 and further achieve a long life of the entire glass laser amplifier.

As the raw material for the trigger wire 4, brass (or a brass coated with a gold, a silver or a chromium plating), aluminium, gold or nickel etc. are suitable. The trigger wire 4 cross section may be a circle or a square or other optional shapes.

As illustrated in FIG. 4, a shield glass 5 of the quartz glass tube mounted between the flash lamps 2 and the disk laser glass 1. The shield glass 5 is provided in order to prevent dust near the flash lamp 2 from entering the area around the disk laser glass 1 or so as to enable protection of the disk laser glass 1 even if any one of the flash lamps 2 explodes.

Nitrogen gas is filled in a clearance 6 formed between the disk laser glass 1 and the shield glass 5 to prevent generation of shock sound, etc.

That is, when the clearance space 6 is filled with air, the oxygen contained in the air is ionized by a light from the flash lamp to generate a shock sound or a substantial high turbulence of air and some bad effects may be applied to the laser beam. If the air is replaced with nitrogen gas, the aforesaid disadvantages may not occur.

In addition to the above, the nitrogen gas is filled in a clearance space 7 formed between the reflection mirror 3 and the shield glass 5 and thereby the flash lamps 2 are cooled and similar to the nitrogen gas in said clearance space 6, the gas may be applied in preventing a generation of shock sound.

The present invention may not only be applied to the disk type glass laser amplifier as described above, but also as illustrated in FIG. 7, it may be applied to a rod type glass laser amplifier.

Figure 7:
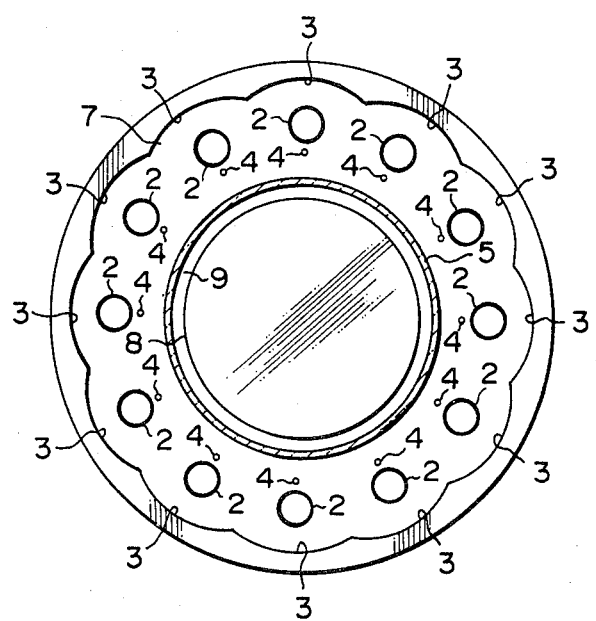
FIG. 7 is a schematic section of the glass laser amplifier having a trigger member of another embodiment of the present invention.

In FIG. 7, a rod laser glass 8 used as a laser glass may perform substantially the same function as that of the aforesaid disk laser glass 1. Cooling water is filled in a clearance space 9 between the rod laser glass 8 and the shield glass 5, and the heated rod laser glass 8 is cooled by the cooling water. As this cooling water, pure water is used.

Nitrogen gas will be filled in clearance space 7 between the reflection mirrors 3 and the shield glass 5.

In this rod type glass laser amplifier are arranged the trigger wires 4 the same as in the aforesaid disk type glass laser amplifier and thereby a durability of the flash lamp 2 may be improved.

In each of said preferred embodiments, a separate or respective connection to the ground or earth may be applied in place of that the trigger wires 4, and the reflection mirrors 3 are connected to the ground in common, and also electricity may be applied to the trigger wires 4.

The trigger wires 4 may be constructed as a conventional shape other than the linear shape, e.g. a mesh form, but it is preferable to make a single trigger wire so as not to obstruct light from the flash lamp.

As described above in detail, in accordance with a glass laser amplifier having a trigger member of the present invention, it is possible to provide an efficient elimination of deflection of electric current in the flash lamp deflected by the reflection mirrors with such an extremely simple arrangement as the trigger member arranged at opposite side of the reflection mirror with the flash lamp being held therebetween. Local heating of the inner wall of the flash lamp is prevented by the efficient elimination of the deflection, it is further possible to have an extreme reduction of strain and tension, resulting in an extensive long life of the entire assembly. An experiment performed in respect to the present invention shows that a life of the flash lamp may be extended more than several times as compared with that of a conventional type.

What is claimed is:

1. A glass laser amplifier comprising a laser glass in which lasing occurs; a number of flash lamps for emitting light to pump said laser glass arranged around said laser glass; a number of reflection mirrors disposed facing said laser glass and oriented for reflecting light from each of said flash lamps against said laser glass; and a number of trigger members arranged adjacent said flash lamps at the opposite side as said reflection mirrors with each of said flash lamps being held between said trigger members and said reflection mirrors so as to eliminate deflection of electric current in each of said flash lamps caused by said reflection mirrors.

2. A glass laser amplifier according to claim 1, wherein said trigger members are mounted in tension in a linear form in the same direction as said reflection mirrors extend.

3. A glass laser amplifier according to claim 1 or 2, further comprising means for connecting said reflection mirrors and said trigger members in common to ground.

4. A glass laser amplifier, comprising:
a laser glass in which lasing can occur in response to optical pumping;
a plurality of flash lamps disposed around said laser glass for emitting light to optically pump said laser glass;
a plurality of mirrors disposed around and facing said laser glass with said flash lamps between said mirrors and said laser glass and with said mirrors oriented to reflect light emitted from said lamps back to said laser glass; and
a plurality of trigger members each corresponding to a respective one of said flash lamps and disposed adjacent its respective flash lamp on a side thereof facing said laser glass and away from said mirrors for eliminating deflection of electric current in its respective flash lamp caused by said mirrors.

5. A glass laser amplifier according to claim 4, wherein said trigger members extend the length of their respective flash lamps and parallel thereto.

6. A glass laser amplifier according to claim 5, wherein said trigger members each comprise a length of wire extending the length of its respective flash lamp and mounted thereon under tension.

7. A glass laser amplifier according to claim 4, further comprising grounding means for grounding said mirrors and said trigger members.

8. A glass laser amplifier according to claim 7, wherein said trigger members extend the length of their respective flash lamps and parallel thereto.

9. A glass laser amplifier according to claim 8, wherein said trigger members each comprise a length of wire extending the length of its respective flash lamp and mounted thereon under tension.

* * * * *